United States Patent
Birkler et al.

(10) Patent No.: US 6,466,951 B1
(45) Date of Patent: Oct. 15, 2002

(54) DATA BASE SYNCHRONIZING SYSTEM WITH AT LEAST TWO HOST DATABASES AND A REMOTE DATABASE

(75) Inventors: Jörgen Birkler, Bara; Patrik Olsson, Malmö; Lars Novak, Bjärred, all of (SE)

(73) Assignee: Telefonaktiebolaget LM Ericsson (publ), Stockhom (SE)

( * ) Notice: Subject to any disclaimer, the term of this patent is extended or adjusted under 35 U.S.C. 154(b) by 0 days.

(21) Appl. No.: 09/499,348

(22) Filed: Feb. 8, 2000

(30) Foreign Application Priority Data

Feb. 10, 1999 (SE) ............................................. 9900457

(51) Int. Cl.⁷ ............................................. G06F 17/30
(52) U.S. Cl. ......................... 707/201; 707/10; 709/248
(58) Field of Search ............................. 707/8, 10, 201, 707/202, 204; 709/248

(56) References Cited

U.S. PATENT DOCUMENTS

| | | | |
|---|---|---|---|
| 5,261,094 A | | 11/1993 | Everson et al. ............ 395/600 |
| 5,392,390 A | * | 2/1995 | Crozier ...................... 345/762 |
| 5,649,195 A | * | 7/1997 | Scott et al. ................. 707/201 |
| 5,684,990 A | * | 11/1997 | Boothby ..................... 707/203 |
| 5,729,735 A | | 3/1998 | Meyering ................... 395/610 |
| 5,781,908 A | * | 7/1998 | Williams et al. ............. 707/10 |
| 5,790,974 A | | 8/1998 | Tognazzini ................. 701/204 |
| 5,873,096 A | | 2/1999 | Lim et al. ................... 707/201 |
| 5,961,590 A | * | 10/1999 | Mendez et al. ............. 709/206 |
| 5,966,714 A | * | 10/1999 | Huang et al. ............... 707/201 |
| 5,974,238 A | * | 10/1999 | Chase, Jr. .................. 707/200 |
| 6,065,018 A | * | 5/2000 | Beier et al. ................. 707/201 |
| 6,226,651 B1 | * | 5/2001 | Masuda et al. ............. 707/200 |
| 6,272,545 B1 | * | 8/2001 | Flanagin et al. ............ 709/201 |

* cited by examiner

Primary Examiner—John Breene
Assistant Examiner—Leslie Wong
(74) Attorney, Agent, or Firm—Nixon & Vanderhye, P.C.

(57) ABSTRACT

A database system has at least two hose databases (204, 214) in respective host processing apparatuses (200, 210). A remote database (224) is provided in a remote processing apparatus (220). The host databases and the remote database store a plurality of database items. A synchronization engine (206, 216) is provided in each host processing apparatus for synchronizing its host database with the remote database. A first log file (227) contains entries, that represent changes made to the remote database (224), including additions and modifications of items in the remote database as well as deletions of items from the remote database in order to increase its free storage space available for storing new items. A second log file (229) contains entries, that represent deletions from the remote database upon respective deletions in either of the host databases (204, 214). The synchronization engine (206, 216) deletes items in its host database in accordance with the entries in the second log file but not in the first log file.

5 Claims, 4 Drawing Sheets

DATA BASE SYNCHRONIZING SYSTEM WITH AT LEAST TWO HOST DATABASES AND A REMOTE DATABASE

TECHNICAL FIELD

The present invention relates to database systems of the type having at least two host processing apparatuses with respective host databases and a remote processing apparatus with a remote database, where the contents of the remote database are synchronized with the host databases, so that changes made to any of the databases are propagated to the other databases.

PRIOR ART

With the terminology above, a host processing apparatus may for instance be a desktop personal computer having a calendar or an address book as its host database. Correspondingly, a remote processing apparatus may be a hand-held communicator, such as a portable digital assistant (PDA) or a mobile telephone, having a corresponding calendar or address book as its remote database. The host and remote databases are intended to contain the same information, i.e. the same calendar or address book entries, and provide great flexibility to a user: when working at his office, the user will use the calendar in his desktop computer for keeping track of meetings, deadlines, birthdays, etc. When the user goes mobile, for instance for visiting customers, business partners, etc, the user will bring his portable digital assistant or mobile telephone and continue to use the calendar in the remote database therein. Changes made to either the host database in the desktop computer or the remote database in the portable digital assistant will have to be propagated to the other database in order to maintain consistency between the databases. The process of forcing two databases to contain the same information is often referred to as synchronization.

U.S. Pat. No. 5,729,735 discloses a computer database system having a master database in a master computer and multiple remote databases in portable computers. The remote databases are initially created by copying data from the master database. For each remote database thus created, the system also creates a backup file, which is stored in the master computer and reflects contents of each remote database, when this was created or last synchronized. For time to time, the system synchronizes data in the master database with one of the remote databases. To this end, the system compares corresponding data in the master database, the remote database and the backup file to determine which database (remote or master) that has a more current version of the data. The system then updates the database that has the less current data with data from the database that has the more current data. After having synchronized the databases, the system copies all data from the remote database to the backup file.

Thus, the database system of U.S. Pat. No. 5,729,735 is capable of synchronizing a master database and a remote database. However, since the synchronization is performed by comparing the whole contents of the master database and the remote database to the whole contents of the backup file (which in itself is a complete copy of the remote database), the procedure is time-consuming and requires a large amount of resources.

U.S. Pat. No. 5,790,974 disclose a personal calendaring system including a portable calendaring system and a complementary office calendar system. Calendar entries are synchronized by two-way wireless transmission, such as infrared link or a radio paging interface. Changes made to one of the calendars are immediately propagated through the wireless interface to the other calendar. The system has an advantage in that synchronization is performed immediately but has a drawback in that it requires operational connection between the two calendars (i.e., that the portable calendaring system is within reach of the infrared link or radio paging interface).

While it may be a straightforward task to synchronize a single host database and a single remote database, the job gets more difficult, when more than two databases are involved. Particularly care has to be exercised in order to avoid that changes made to one of the databases propagate incorrectly to the other databases. One such situation is when the remote database has limited storage capacity (for instance due to limited memory size in a portable digital assistant, etc). For such a limited-size remote database, old database items stored therein may sometimes have to be sacrificed (i.e. deleted) in order to make room for new items. Such deletions, which are made only in order to release storage space in the remote database, must not propagate to the other databases.

SUMMARY OF THE INVENTION

It is an object of the present invention to provide a database system involving at least two host databases and a remote database, which system is capable of performing synchronization more efficiently than the prior art solutions.

It is a particular purpose of the invention to prevent deletions, that are only made in order to release storage space in the remote database, from propagating to the host databases.

The above objects are achieved for a database system having at least two host databases and a remote database, where the host databases and the remote database are synchronized by means of a synchronization engine for each host database, by the provision of a first log file having entries representing changes made to the remote database, including additions and modifications of items in the remote database as well as deletions of items from the remote database in order to increase its free storage space available for storing new items, and by the provision of a second log file having entries representing deletions from the remote database upon respective deletions in either of the host databases, wherein the synchronization engine is adapted to perform deletions of items in its host database in accordance with the entries in the second log file but not in the first log file.

Other objects, advantages and features of the present invention will appear from the following detailed disclosure of a preferred embodiment, from the attached drawings as well as from the appended claims.

BRIEF DESCRIPTION OF THE DRAWINGS

A preferred embodiment of the present invention will now be described in more detail with reference to the attached drawings, in which.

DETAILED DISCLOSURE

Figure 1:
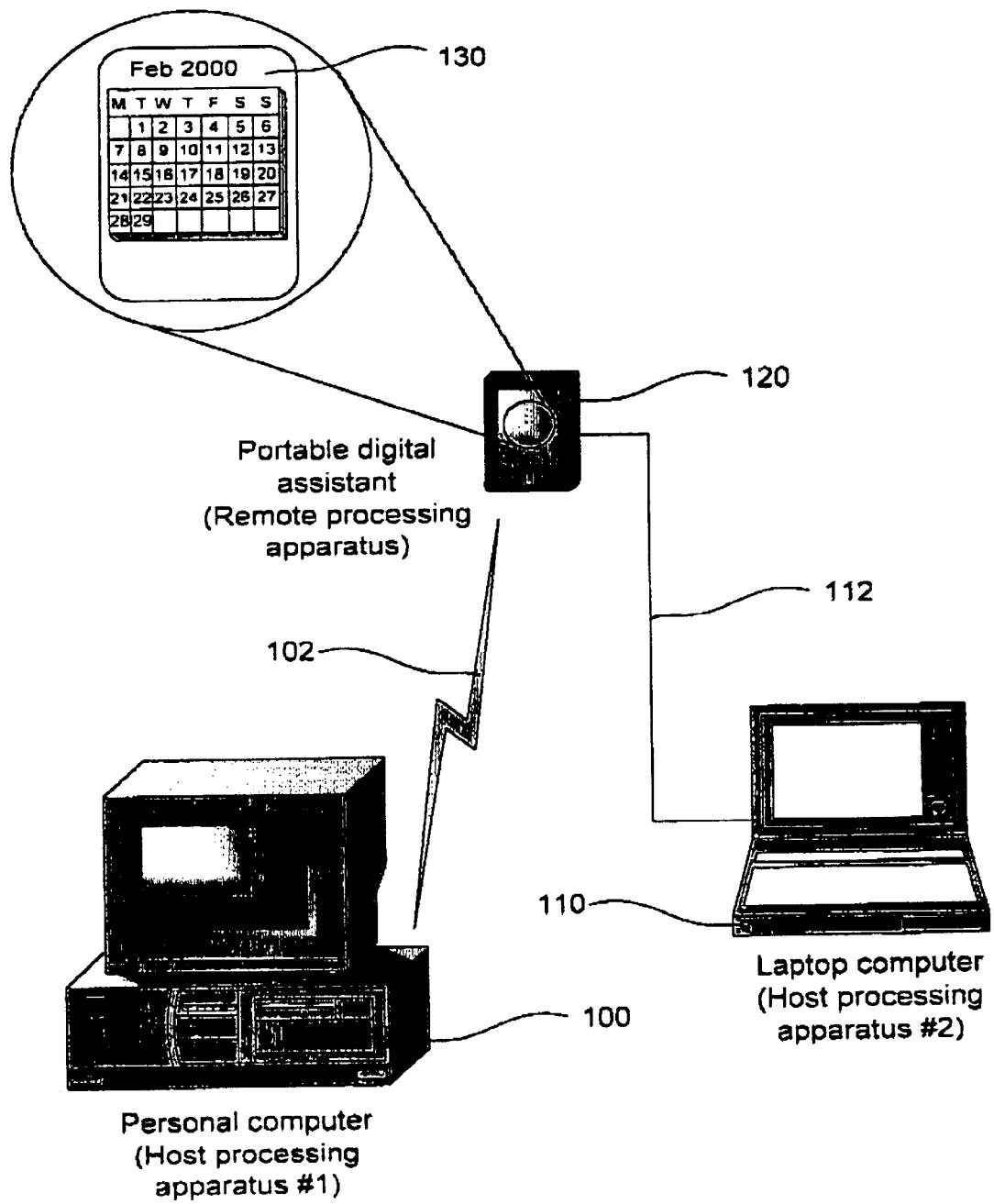
FIG. 1 is a schematic view of two host processing apparatuses, having respective host databases, and a remote processing apparatus, having a remote database.

FIG. 1 illustrates a database system according to a preferred embodiment of the invention. A first host processing apparatus 100 is a desktop personal computer and has a first host database, which will be described in more detail below with reference to FIG. 2. The host database of the personal computer 100 may for instance be a calendar, an address book, etc.

Figure 2:
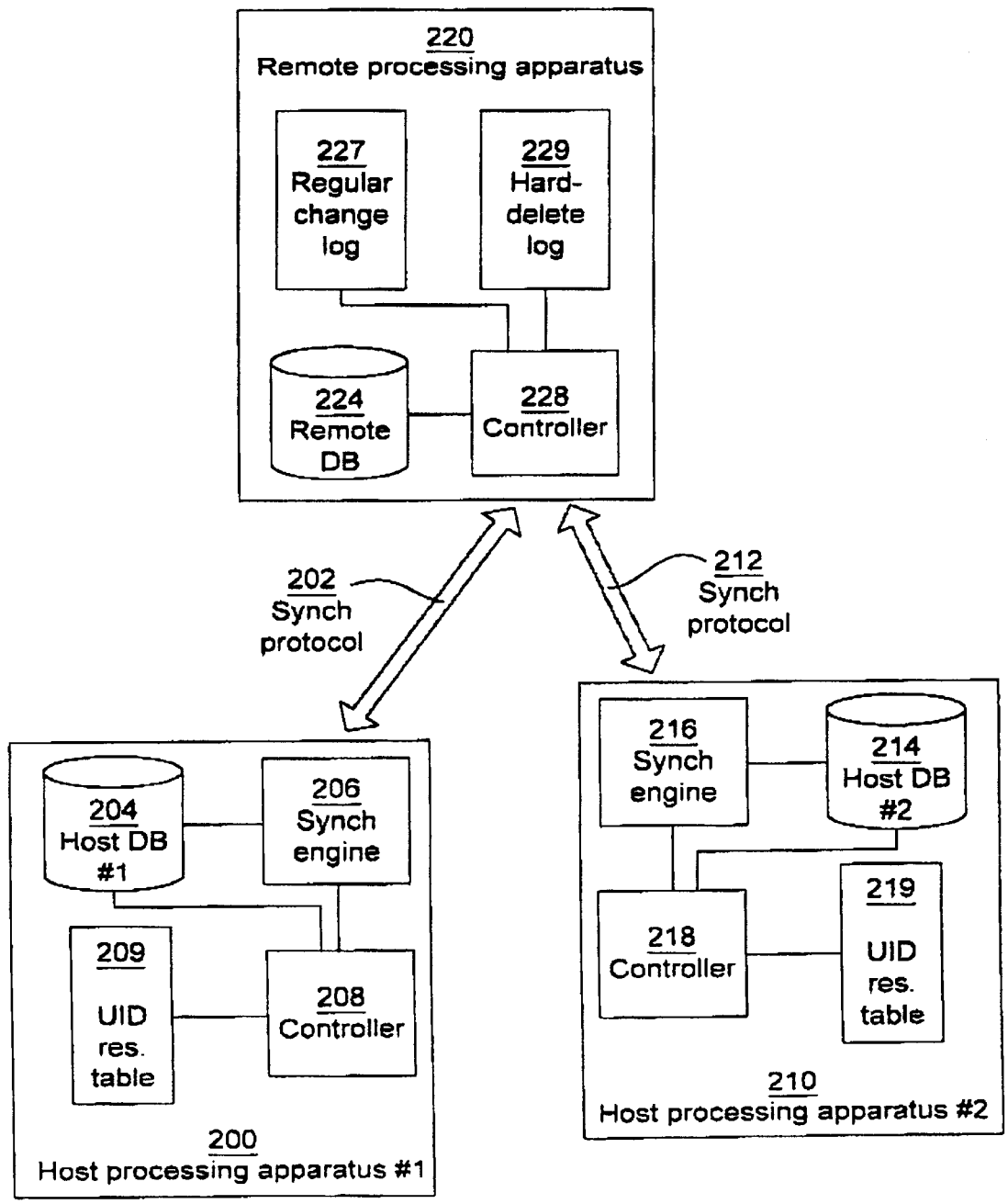
FIG. 2 is a schematic block diagram of the host and remote processing apparatuses shown in FIG. 1.

A remote processing apparatus 120 is a portable digital assistant, which contains a remote database (shown in FIG. 2). The remote database contains a copy or version of the calendar 130, the original of which is stored in the personal computer 100. A user may connect the portable digital assistant 120 to the personal computer 100 over a wireless link 102, such as a short-range radiolink (e.g. Bluetooth) or an infrared link.

Additionally, a second host processing apparatus 110 is provided in FIG. 1 in the form of a laptop computer. The laptop computer 110 comprises a second host database (shown in FIG. 2), which also contains a copy or version of the calendar 130. The user may connect the portable digital assistant 120 to the laptop computer 110 by a wire-based connection 112, such as a serial cable. However, the means for interconnecting the personal computer 100, the laptop computer 110 and the portable digital assistant 120 may be other than the ones illustrated in FIG. 1.

Summarizing FIG. 1, the user may use his calendar 130 from the personal computer 100, from the laptop computer 110 and from the portable digital assistant 120. In this way, maximum flexibility is provided, and the user has access to his calendar 130 through a different one of the three computers 100, 110, 120, depending on his momentary location and work situation. The user may add new entries to his calendar 130 in any of the computers 100, 110 and 120. Similarly, he may modify entries in the calendar 130 from any of the computers 100, 110, 120. Additionally, entries in the calendar 130 may be deleted from any of the computers 100, 110, 120.

Whenever such changes are made to the calendar 130, they will initially take place locally in the particular one of the computers 100, 110 or 120, that the user is momentarily accessing his calendar from. These changes must subsequently be propagated to the other two computers, so that consistency is maintained between all three versions of the calendar 130. As described in previous sections of this document, this procedure is referred to as synchronization.

Turning now to FIG. 2, the personal computer 100 is illustrated as a first host processing apparatus 200 in FIG. 2. Moreover, the laptop computer 110 is illustrated as a second host processing apparatus 210, and the portable digital assistant 120 is illustrated as a remote processing apparatus 220 in FIG. 2.

The first host processing apparatus 200 comprises the first host database 204, which has been referred to above and contains a first version of the calendar 130 shown in FIG. 1. A controller 208 is coupled to the first host database 204 and is responsible for the overall operation of the first host processing apparatus 200. Moreover, a synchronization engine 206 is provided in the first host processing apparatus 200 and is connected both to the first host database 204 and to the controller 208. The task of the synchronization engine 206 is to perform synchronization with the remote processing apparatus 220 (and the remote database 224 stored therein) according to a synchronization protocol 202. Finally, the first host processing apparatus 200 comprises a UID resolution table 209, where UID means Unique IDentifier. As will be described in more detail below, a UID is a unique number, which is assigned to each database item.

The second host processing apparatus 210 comprises a second host database 214, which is connected to a controller 218 and to a synchronization engine 216. The synchronization engine 216 is adapted to perform synchronization between the second host database 214 of the second host processing apparatus 210 and the remote database 224 of the remote processing apparatus 220 according to a synchronization protocol 212. The second host processing apparatus 210 also has a UID resolution table 219, corresponding to the table 209 of the first host processing apparatus 200.

The remote processing apparatus 220 comprises a controller 228, which is connected to aforesaid remote database 224. The controller 228 is adapted to communicate according to the synchronization protocols 202, 212 with the respective synchronization engines 206 and 216 of the first and second host processing apparatuses 200 and 210, respectively. The remote processing apparatus 220 also has a regular change log 227 and a hard-delete log 229, which will be described in more detail below.

The first host database 204, the second host database 214 and the remote database 224 will all contain a respective version of the calendar 130 shown in FIG. 1.

The synchronization engines 206 and 216 are capable of performing a so-called slow synchronization with the remote database 224 of the remote processing apparatus 220. A slow synchronization is a process, where the synchronization engine 206 and 216 reads all database items from the remote database 224 and matches these items with the database items stored in the host database 204 or 214. The synchronization engine also reads all items stored in the host database and matches them with the items stored in the remote database. Items that cannot be matched will be added to the remote database or to the host database. At the same time, the UID resolution table 209 or 219 will be created. The UID resolution table reflects the relationship between items in the host database 204 or 214, respectively, and the remote database 224. If a UID is known for a particular item in the host database 204 or 214, the corresponding item in the remote database 224 will be provided by the UID resolution table 209 or 219.

A slow synchronization is preferably performed, when the calendar 130 is initially created or loaded into e.g. the first host database 204 of the first host processing apparatus 200.

The synchronization engines 206 and 216 are also capable of performing a so-called semi-slow synchronization, wherein all items are read from the remote database 224 and are matched with the items in the host database 204 or 214. Items that cannot be matched will be added to the remote database 224 or the host database 204 or 214, respectively. The synchronization engines 206, 216 are preferably implemented as software program routines, which are stored in respective memories associated with the controller 208 and 218, respectively, and may be executed by the same.

Referring now to the remote processing apparatus 220, the purpose of the regular change log 227 is to keep track of changes made to the remote database 224. The regular change log 227 may be of a fixed size; old changes are pushed out of the change log 227, as new ones are added, according to a FIFO approach (First In First Out). Each entry 230 in the regular change log 227 has an event (add, delete or modify), the UID for the database item affected and a change counter valve. The change counter is a counter, that is increased for each change (add, modify and delete) made to the remote database 224. The change counter is stored in the regular change log 227 and is also saved in the respective synchronization engine 206, 216 after a completed synchronization procedure.

The regular change log 227 can be retrieved by the synchronization engine 206 or 216. By using the change counter, the synchronization engine 206 or 216 may restrict its synchronization procedure to recent changes, i.e. changes that have occurred after the last completed synchronization procedure.

If the regular change log 227 contains all changes since the last synchronization procedure, only such items in the remote database 224 and the host database 204 or 214 need to be compared and transferred between the remote processing apparatus 220 and the synchronization engine 206 or 216. This speeds up the synchronization procedure significantly and is referred to as a fast synchronization.

Therefore, according to the invention, synchronization may be performed more efficiently between the host databases 204, 214 and the remote database 224, thanks to the provision of the regular change log 227. However, a potential problem arises from the fact that there are two different possible situations, in which one of the synchronization engines 206 or 216 deletes items from the remote database 224:

Situation 1. The synchronization engine 206 or 216 deletes items from the remote database 224 in order to make room for new items to be stored therein. In other words, the remote database 224 does not have sufficient available storage space for storing new items, and therefore the required amount of storage space is released by the synchronization engine 206 or 216 by deleting old items in the remote database 224. This may for instance be done in order to maintain a sliding window for the calendar 130.

Situation 2. When items are deleted from the host database 204 or 214 by the user, the synchronization engine 206 or 216 will delete corresponding items from the remote database 224.

An example is illustrated in the following, where the remote database 224 is synchronized with the two host databases 204 and 214 and aforesaid potential problem arises.

1. The first synchronization engine 206 of the first processing apparatus 200 starts a synchronization procedure with the remote processing apparatus 220.
2. Synchronization engine 206 deletes an item from the remote database 224 in order to make room for new items.
3. Since an item was deleted from the remote database 224, the remote processing apparatus 220 makes a delete-entry in the regular change log 227 for the deleted item.
4. Synchronization engine 206 finishes the synchronization procedure.
5. The second synchronization engine 216 of the second host processing apparatus 210 starts a synchronization procedure with the remote processing apparatus 220.
6. Synchronization engine 216 examines the regular change log 227 in the remote processing apparatus 220 and notices that an item has been deleted.
7. Synchronization engine 216 therefore deletes this item from its second host database 214.
8. Synchronization engine 216 completes its synchronization procedure.

In step 7, the item should not have been deleted from the second host database 214, since the synchronization engine 206 of the first host processing apparatus 200 only deleted this item from the remote database 224 in order to make room for new items to be stored therein. Therefore, there is a potential risk of items being accidentally deleted from either of the host databases 204 or 214, when the remote processing apparatus 220 is synchronized with more than one host processing apparatus 200 and 210.

The above problem is solved by:
Introducing two types of deletes: soft deletes and hard deletes.
Introducing two commands, one for soft deletes and one for hard deletes.
Introducing the hard-delete log 229 to keep track of items, that have been hard-deleted.
Combining the regular change log 227 and the hard-delete log 229 into a combined change log in an appropriate way, when the synchronization engine 206 or 216 requests the change log from the remote processing apparatus 220.

Soft delete is used by the synchronization engine to delete items in the remote database 224 in order to make room for new items therein.

Hard delete is used by the synchronization engine to delete such items from the remote database 224, that have been deleted from the host database 204 or 214. Hard deletes will propagate as hard deletes to other host processing apparatuses, that the remote processing apparatus is synchronized with (i.e., to the second host processing apparatus 210, if the hard delete is initiated by the first host processing apparatus 200, and vice versa).

Figure 3:
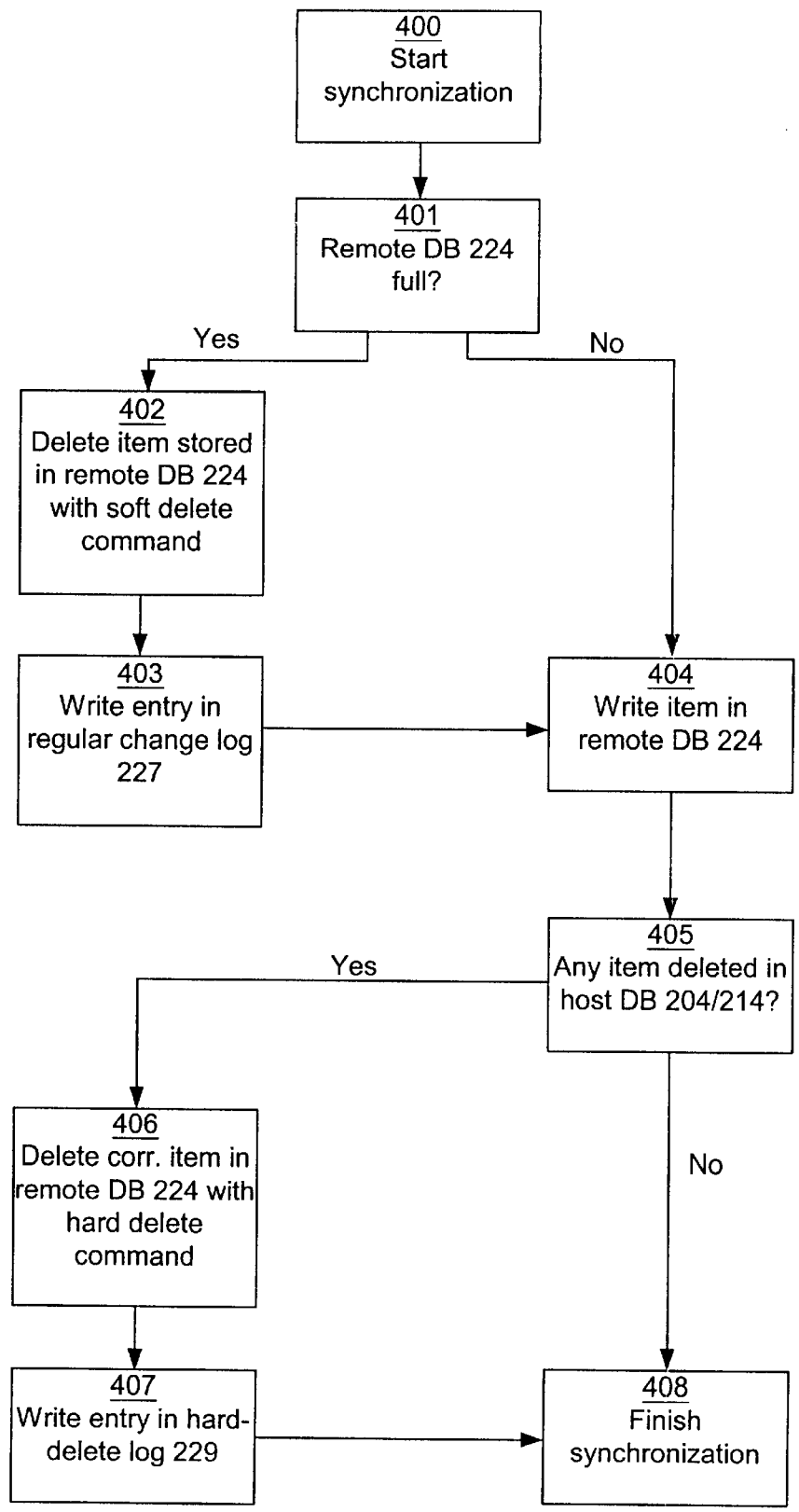
FIG. 3 is a flowchart illustrating deletion of an item in a remote database.

FIG. 3 illustrates a flowchart, in which an embodiment of the synchronizing of the remote database 224 with the host database 204, 214 is shown in a number of steps 400–408.

The synchronization engine 206 or 216 uses two different commands when performing hard delete and soft deletes in the remote database 224. The remote processing apparatus 220 maintains the separate hard-delete log 229, in addition the regular change log 227, for keeping track of items, that have been hard-deleted from the remote database. The hard-delete log 229 may be of fixed or dynamic size. Preferably, the newest entry 231 should be at the top of the log. If the log flows over, the oldest entry in the log should be discarded. Each entry 231 should be at the top of the log. If the log flows over, the oldest entry in the log should be discarded. Each entry 231 in the hard-delete log 229 preferably has the same attributes as entries 230 in the regular change log 227: an event (always hard delete), the UID for the deleted database item and a change counter value.

When the remote processing apparatus 220 receives a soft delete command from either of the host processing apparatuses 200 or 210, it will make an entry 230 in the regular change log 227. Correspondingly, when the remote processing apparatus 220 receives a hard delete command, it will make an entry 231 in the hard-delete log 229.

As previously mentioned, the synchronization engine 206 or 216 is adapted to receive the contents of the change logs from the remote processing apparatus 220. Preferably, these contents is communicated to the host processing apparatus 200 or 210 in the form of a combined change log, including entries 230, 231 from the regular change log 227 as well as the hard-delete log 229.

Figure 4:
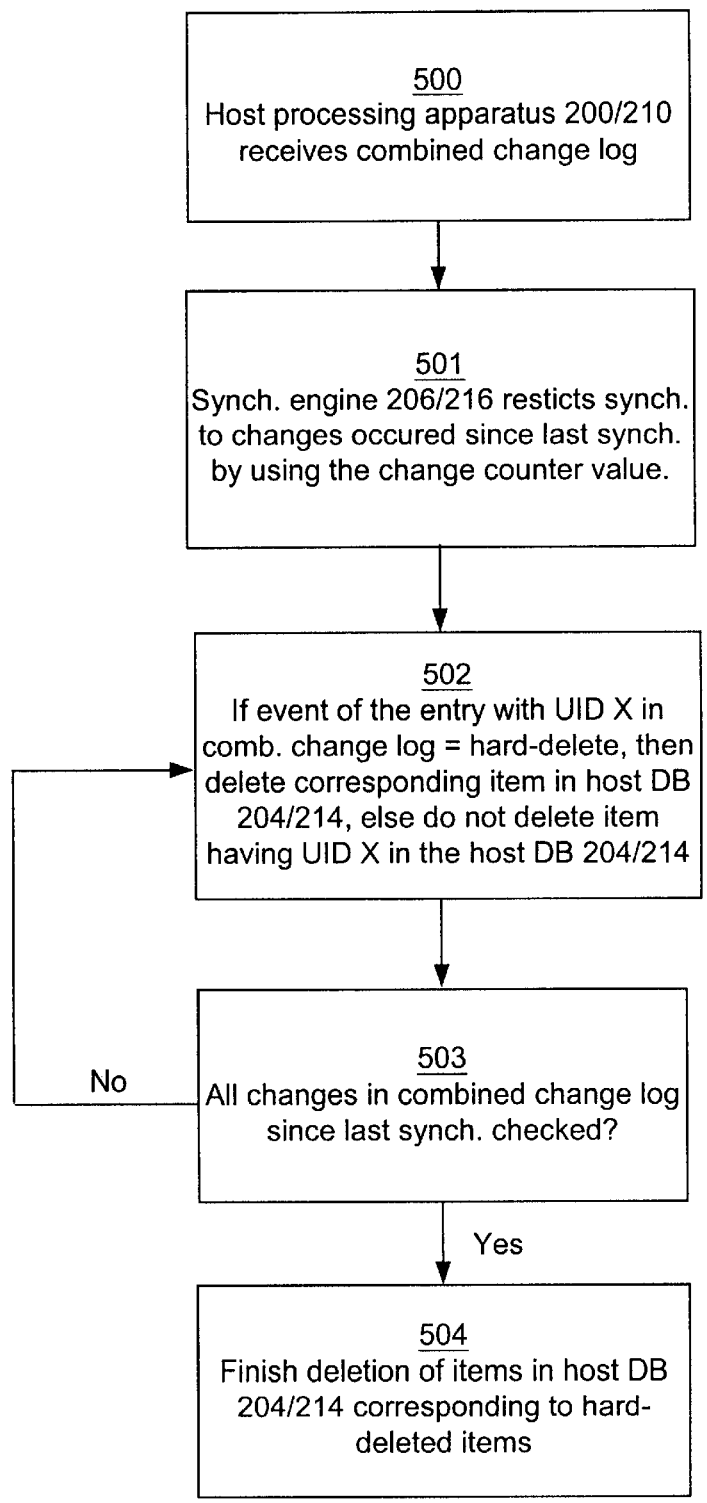
FIG. 4 is a flowchart illustrating deletion of items of a host database relating to entries in a second log file.

FIG. 4 illustrates a flowchart, wherein an embodiment of the synchronization engine 206, 216 performing deletions of items in its host database 204, 214 in accordance with the entries in the hard-delete log 229 but not in the regular change lot 227 are shown in a number of steps 500–504.

It may be necessary to distinguish between two different types of combined change logs: type 1 and type 2. A combined change log of type 1 will include entries 230, 231 from both the regular change log 227 and the hard-delete log 229. Preferably, the entries 230, 231 are listed with the newest entries 230, 231 at the top of the combined change log. A combined change log of type 2 will include entries 231 from the hard-delete log 229 and a predetermined control character, such as "☐", indicating that the regular change log 227 is full. Preferably, the entries 231 from the hard-delete log are listed with the newest entries 230, 231 at the top of the combined change log.

If a combined change log of type 1 is received by the synchronization engine 206 or 216, the entries 230, 231 therein are handled through a fast synchronization procedure. On the other hand, if a combined change log of type 2 is received, the synchronization engine 206 or 216 will handle the entries 230, 231 therein through a fast synchronization procedure and then move to perform a semi-slow synchronization procedure.

It may be necessary to distinguish between two different types of combined change logs: type 1 and type 2. A combined change log of type 1 will include entries from both the regular change log 227 and the hard-delete log 229. Preferably, the entries are listed with the newest entries at the top of the combined change log. A combined change log of type 2 will include entries from the hard-delete log 229 and a predetermined control character, such as "☐", indicating that the regular change log 227 is full. Preferably, the entries from the hard-delete log are listed with the newest entries at the top of the combined change log.

If a combined change log of type 1 is received by the synchronization engine 206 or 216, the entries therein are handled through a fast synchronization procedure. On the other hand, if a combined change log of type 2 is received, the synchronization engine 206 or 216 will handle the entries therein through a fast synchronization procedure and then move to perform a semi-slow synchronization procedure.

The present invention has been described above with reference to a preferred embodiment. However, other embodiments than the one disclosed herein are equally possible within the scope of the invention, as defined by the appended patent claims. For instance, the invention may be exercised with more than two host databases, which are synchronized with a remote database. Moreover, the terms "host database" and "remote database" are to be given their widest possible interpretation. The invention is not restricted to situations, where the host databases are located in stationary apparatuses and the remote database is located in a portable apparatus; the opposite situation also falls within the scope of the invention. The host and remote processing apparatuses may be of virtually any kind capable of storing a host or remote database. Non-limiting examples are desktop computers, laptop computers, hand-held computers, portable digital assistants, mobile telephones, etc.

What is claimed is:

1. A database system comprising:

at least two host databases in respective host processing apparatuses;

a remote database in a remote processing apparatus, where the host databases and the remote database are adapted to store a plurality of database items;

a synchronization engine in each host processing apparatus for synchronizing its host database with the remote database;

a first log file having entries representing changes made to the remote database, including additions and modifications of items in the remote database as well as deletions of items from the remote database in order to increase its free storage space available for storing new items; and a second log file having entries representing deletions from the remote database upon respective deletions in either of the host databases, wherein the synchronization engine is adapted to perform deletions of items in its host database in accordance with the entries in the second log file but not in the first log file.

2. A database system according to claim 1, wherein the remote processing apparatus is a portable digital assistant.

3. A database according to claim 1, wherein the remote processing apparatus is a mobile telephone.

4. A database system according to claim 1, wherein at least one of said host processing apparatuses is a desktop computer or laptop computer.

5. A method of synchronizing at least two host databases and a remote database, comprising:

providing a first delete command for deleting items stored in the remote database, when the remote database is full, providing a second delete command for deleting such items from the remote database which have been deleted from either of the host databases, maintaining a first log file for keeping track of items which are related to the first delete command, and maintaining a second log file for keeping track of items which are related to the second delete command.

* * * * *